(12) United States Patent
Shknevsky et al.

(10) Patent No.: US 12,411,620 B2
(45) Date of Patent: Sep. 9, 2025

(54) LOW HICCUP TIME FAIL-BACK IN ACTIVE-ACTIVE DUAL-NODE STORAGE SYSTEMS WITH LARGE WRITES

(71) Applicant: Dell Products L.P., Round Rock, TX (US)

(72) Inventors: Alexander Shknevsky, Fair Lawn, NJ (US); Oran Baruch, Tel Aviv (IL); Maor Rahamim, Ramla (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/204,444

(22) Filed: Jun. 1, 2023

(65) Prior Publication Data
US 2024/0402917 A1 Dec. 5, 2024

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 7,165,129 B1 * | 1/2007 | Okmianski | G06F 12/0868 711/135 |
| 7,739,546 B1 * | 6/2010 | Rodrigues | G06F 11/1662 714/13 |
| 8,990,615 B1 * | 3/2015 | Derbeko | G06F 11/1662 714/6.32 |
| 10,896,200 B1 * | 1/2021 | Krishnan | H04L 67/1097 |
| 11,157,198 B2 | 10/2021 | Ma et al. | |
| 11,347,725 B2 | 5/2022 | Shveidel et al. | |
| 11,513,701 B2 | 11/2022 | Shveidel et al. | |
| 11,630,584 B2 | 4/2023 | Vankamamidi et al. | |
| 2008/0082856 A1 * | 4/2008 | French | G06F 11/2089 714/2 |

(Continued)

*Primary Examiner* — Jared I Rutz
*Assistant Examiner* — Elias Young Kim
(74) *Attorney, Agent, or Firm* — BainwoodHuang

(57) ABSTRACT

Techniques for limiting or reducing storage accessibility "hiccups" in active-active clustered systems that perform large writes. The techniques can include executing, by a surviving, failover, or rebooted node of an active-active clustered system, a specialized recovery protocol that includes treating each large write request from a host computer as a plurality of small write requests while execution of the specialized recovery protocol is in progress, draining all dedicated sub-ubers for a primary and secondary node of the active-active clustered system, and, having completed execution of the specialized recovery protocol, resuming normal treatment of large write requests from the host computer. In this way, the need and complexity of managing large writes and maintaining their corresponding sub-uber information during recovery from a forced reboot, crash, or disaster involving the primary or secondary node can be avoided, and storage accessibility hiccups due to performing the large writes can be limited or reduced.

20 Claims, 5 Drawing Sheets

(56) References Cited

U.S. PATENT DOCUMENTS

| | | | |
|---|---|---|---|
| 2010/0049902 A1* | 2/2010 | Kakihara | G06F 12/0873 |
| | | | 711/E12.019 |
| 2017/0351613 A1* | 12/2017 | Anderson | G06F 12/0833 |
| 2021/0034266 A1 | 2/2021 | Chawla et al. | |
| 2021/0073089 A1* | 3/2021 | Sathavalli | G06F 9/45558 |
| 2022/0137813 A1 | 5/2022 | Nanda et al. | |
| 2022/0334965 A1 | 10/2022 | Shveidel et al. | |
| 2022/0404977 A1* | 12/2022 | Ito | G06F 3/065 |
| 2023/0012021 A1 | 1/2023 | Chen et al. | |
| 2023/0107227 A1* | 4/2023 | Tan | G06F 12/0246 |
| | | | 711/154 |

\* cited by examiner

LOW HICCUP TIME FAIL-BACK IN ACTIVE-ACTIVE DUAL-NODE STORAGE SYSTEMS WITH LARGE WRITES

BACKGROUND

Active-active dual-node storage systems (or "active-active clustered systems") enable multiple storage processors or nodes to have read-write input/output (IO) access to the same storage objects such as logical units (LUs), volumes, filesystems, and/or other storage objects or resources. Such active-active clustered systems include primary nodes and secondary nodes, as well as multiple storage tiers including low capacity tiers (e.g., page descriptor (PD) tiers, page buffer (PB) tiers) implemented using persistent memory such as nonvolatile random access memory (NVRAM), and higher capacity tiers (e.g., user data (UD) tiers) implemented using persistent storage devices such as solid-state drives (SSDs) and/or hard disk drives (HDDs). The primary and secondary nodes include their own PB tiers for logging PB data, and share a PD tier for logging PD metadata. The primary and secondary nodes further share a UD tier for storing user data on one or more storage objects such as LUs, volumes, and/or filesystems.

SUMMARY

In accordance with the present disclosure, a primary node and a secondary node of an active-active clustered system can perform small write operations or "small writes" that include logging PD metadata associated with the small writes in a shared PD tier, and logging PB data associated with the small writes in their own PB tiers. The primary and secondary nodes can further perform asynchronous flush operations that include flushing or moving PB data to a storage array, and maintaining logical block address (LBA) mappings of locations of the PB data within the storage array. For example, each logged PD metadata element may have a size of 512 bytes or any other suitable size, and each logged PB data element may have a size of 4 kilobytes (Kb) or any other suitable size. The primary and secondary nodes can also perform large write operations or "large writes" that include logging PD metadata associated with the large writes in the PD tier, and storing or ingesting chunks of user data associated with the large writes directly to a user data (UD) tier within the storage array. For example, each user data chunk may have a size of 1 megabyte (Mb) or any other suitable size and be made up of 256 4 Kb PB data elements. In one embodiment, the UD tier can be configured to include a plurality of large (e.g., 64 gigabyte (Gb)) storage portions referred to herein as "ubers," each of which can include a plurality of smaller (e.g., 8 Gb) storage sub-portions referred to herein as "sub-ubers." In this embodiment, each sub-uber can include a plurality of physical large blocks (PLBs) (e.g., 2 Mb PLBs), to which the 1 Mb user data chunks can be stored or ingested. The primary and secondary nodes can allocate PLB storage for their own dedicated sub-ubers in the UD tier, read user data chunks stored in all sub-ubers in the UD tier, and perform asynchronous flush operations on all sub-ubers to maintain LBA mappings of locations of user data chunks within the storage array. Information pertaining to the sub-ubers such as address locations of dedicated sub-ubers for the primary and secondary nodes in the UD tier, identifiers of storage nodes that allocated storage for the dedicated sub-ubers, and states (e.g., available, unavailable, consumed) of the dedicated sub-ubers, can be maintained by a computerized sub-uber manager.

In further accordance with the present disclosure, in response to a forced reboot, crash, or disaster involving one or both of a primary node and a secondary node of an active-active clustered system performing small writes, a recovery protocol can be executed to recover in-memory representations of data and/or metadata associated with the small writes. In one embodiment, a surviving, failover, or rebooted node from among the primary and secondary nodes can execute the recovery protocol, which can include entering a quiescent mode of operation, and, having entered the quiescent mode of operation, quiescing all incoming small write requests from host computers, quiescing writing data and/or metadata to the other storage node (if active) of the active-active clustered system, reading persistent logs for PD metadata and PB data associated with the small writes, and constructing in-memory representations of the PD and PB metadata/data based on the persistent PD/PB log information. Once execution of the recovery protocol has been completed, the surviving, failover, or rebooted node can send a notification to the other storage node (if active), exit the quiescent mode of operation, and maintain storage accessibility of the recovered data/metadata.

Techniques are disclosed herein for limiting or reducing storage accessibility "hiccups" in active-active clustered systems that perform large write operations ("large writes"). In the disclosed techniques, an active-active clustered system can employ a UD tier configured to include a plurality of ubers, in which each uber includes a plurality of sub-ubers, and each sub-uber includes a plurality of PLBs into which chunks of user data associated with the large writes can be stored or ingested. The disclosed techniques can include, in response to a large write request from a host computer at a primary node or a secondary node of the active-active clustered system, performing, by the primary or secondary node, a large write including logging PD metadata associated with the large write in a shared PD tier, and ingesting a chunk of user data directly to the UD tier within a storage array. For example, each uber may have a size of 64 Gb, each sub-uber may have a size of 8 Gb, and each PLB may have a size of 2 Mb. Further, each logged PD metadata element may have a size of 512 bytes, and each ingested user data chunk may have a size of 1 Mb and be made up of 256 4 Kb PB data elements.

The disclosed techniques can include, in response to a forced reboot, crash, or disaster involving the primary node or the secondary node of the active-active clustered system, executing, by a surviving, failover, or rebooted node from among the primary and secondary nodes, a specialized recovery protocol that avoids the need and complexity of interacting with the sub-uber manager to manage large writes and maintain their corresponding sub-uber information. In the disclosed techniques, the specialized recovery protocol can include treating each large (e.g., 1 Mb) write request from a host computer as a plurality of small (e.g., 4 Kb) write requests (e.g., 256 small write requests), and performing a small write for each such small write request. Each small write can include logging PD metadata in the PD tier, and logging PB data in the PB tier. In the disclosed techniques, the specialized recovery protocol can include draining all dedicated sub-ubers for the primary and secondary nodes in the UD tier, and, having drained all of the dedicated sub-ubers, resuming normal treatment of large write requests from the host computer.

By executing, by a surviving, failover, or rebooted node of an active-active clustered system, a specialized recovery protocol that includes treating each large write request from a host computer as a plurality of small write requests while execution of the specialized recovery protocol is in progress, draining all dedicated sub-ubers for primary and secondary nodes of the active-active clustered system, and, having completed execution of the specialized recovery protocol, resuming normal treatment of large write requests from the host computer, the need and complexity of managing the large writes and maintaining their corresponding sub-uber information can be avoided. In this way, storage accessibility hiccups due to performing large writes by an active-active clustered system can be limited or reduced.

In certain embodiments, a method of limiting or reducing storage accessibility hiccups in active-active clustered systems that perform large write operations includes executing, by a first node of an active-active clustered system, a specialized recovery protocol for data and/or metadata associated with the large write operations. The specialized recovery protocol includes treating each large write request from a host computer as a plurality of small write requests, and draining dedicated sub-ubers for the first node and a second node of the active-active clustered system. The method includes, having completed execution of the specialized recovery protocol, resuming, by the first node of the active-active clustered system, normal treatment of large write requests from the host computer.

In certain arrangements, the active-active clustered system includes multiple storage tiers, including a page descriptor (PD) tier, a page buffer (PB) tier, and a user data (UD) tier. The method includes, for each large write request, performing a large write operation including logging PD metadata associated with the large write operation in the PD tier, and storing a user data chunk directly to the UD tier, in which the user data chunk is made up of a plurality of PB data elements.

In certain arrangements, the method includes storing the user data chunk directly to a dedicated sub-uber in the UD tier, and performing asynchronous flush operations on the dedicated sub-ubers in the UD tier.

In certain arrangements, the method includes, for each small write request, performing a small write operation including logging PB data associated with the small write operation in the PB tier, logging PD metadata associated with the small write operation in the PD tier, and maintaining in-memory representations of the PB and PD data/metadata based on the logged PB and PD data/metadata.

In certain arrangements, the first node includes a sub-uber resource allocator. The method includes purging addresses of user data chunks stored in the dedicated sub-ubers from the sub-uber resource allocator, and waiting for inflight large write operations to complete.

In certain arrangements, the method includes, having purged the addresses of user data chunks from the sub-uber resource allocator and waited for the inflight large write operations to complete, performing forced flush operations on the dedicated sub-ubers in the UD tier.

In certain arrangements, the method includes directing the sub-uber resource allocator to allocate storage for dedicated sub-ubers in the UD tier.

In certain arrangements, the first node corresponds to a failover node, and the second node corresponds to a failback node. The method includes, during execution of the specialized recovery protocol, treating, by the failback node, each large write request from the host computer as a plurality of small write requests.

In certain arrangements, the method includes, in response to the failover node becoming inactive during execution of the specialized recovery protocol, restarting the specialized recovery protocol by the failback node.

In certain embodiments, a system for limiting or reducing storage accessibility hiccups in active-active clustered systems that perform large write operations includes a memory and processing circuitry configured to execute program instructions out of the memory to execute, by a first node of an active-active clustered system, a specialized recovery protocol for data and/or metadata associated with large write operations. The specialized recovery protocol includes treating each large write request from a host computer as a plurality of small write requests, and draining dedicated sub-ubers for the first node and a second node of the active-active clustered system. The processing circuitry is configured to execute the program instructions out of the memory to, having completed execution of the specialized recovery protocol, resume, by the first node of the active-active clustered system, normal treatment of large write requests from the host computer.

In certain arrangements, the active-active clustered system includes multiple storage tiers, including a page descriptor (PD) tier, a page buffer (PB) tier, and a user data (UD) tier. The processing circuitry is configured to execute the program instructions out of the memory to, for each large write request, perform a large write operation including logging PD metadata associated with the large write operation in the PD tier, and storing a user data chunk directly to the UD tier, in which the user data chunk is made up of a plurality of PB data elements.

In certain arrangements, the processing circuitry is configured to execute the program instructions out of the memory to store the user data chunk directly to a dedicated sub-uber in the UD tier, and perform asynchronous flush operations on the dedicated sub-ubers in the UD tier.

In certain arrangements, the processing circuitry is configured to execute the program instructions out of the memory to perform, for each small write request, a small write operation including logging PB data associated with the small write operation in the PB tier, logging PD metadata associated with the small write operation in the PD tier, and maintaining in-memory representations of the PB and PD data/metadata based on the logged PB and PD data/metadata.

In certain arrangements, the first node includes a sub-uber resource allocator. The processing circuitry is configured to execute the program instructions out of the memory to purge addresses of user data chunks stored in the dedicated sub-ubers from the sub-uber resource allocator, and wait for inflight large write operations to complete.

In certain arrangements, the processing circuitry is configured to execute the program instructions out of the memory to, having purged the addresses of user data chunks from the sub-uber resource allocator and waited for the inflight large write operations to complete, perform forced flush operations on the dedicated sub-ubers in the UD tier.

In certain arrangements, the processing circuitry is configured to execute the program instructions out of the memory to direct the sub-uber resource allocator to allocate storage for dedicated sub-ubers in the UD tier.

In certain arrangements, the first node corresponds to a failover node and the second node corresponds to a failback node. The processing circuitry is configured to execute the program instructions out of the memory to, during execution of the specialized recovery protocol, treat, by the failback node, each large write request from the host computer as a plurality of small write requests.

In certain arrangements, the processing circuitry is configured to execute the program instructions out of the memory to, in response to the failover node becoming inactive during execution of the specialized recovery protocol, restart the specialized recovery protocol by the failback node.

In certain embodiments, a computer program product includes a set of non-transitory, computer-readable media having instructions that, when executed by processing circuitry, cause the processing circuitry to perform a method including executing, by a first node of an active-active clustered system, a specialized recovery protocol for data and/or metadata associated with large write operations. The specialized recovery protocol includes treating each large write request from a host computer as a plurality of small write requests, and draining dedicated sub-ubers for the first node and a second node of the active-active clustered system. The method includes, having completed execution of the specialized recovery protocol, resuming, by the first node of the active-active clustered system, normal treatment of large write requests from the host computer.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary active-active clustered system that can be employed in the storage environment of FIG. 1a;

DETAILED DESCRIPTION

Techniques are disclosed herein for limiting or reducing storage accessibility "hiccups" in active-active dual-node storage systems (or "active-active clustered systems") that perform large write operations (or "large writes"). The disclosed techniques can include executing, by a surviving, failover, or rebooted node of an active-active clustered system, a specialized recovery protocol that includes treating each large write request from a host computer as a plurality of small write requests while execution of the specialized recovery protocol is in progress, draining all dedicated sub-ubers for a primary node and a secondary node of the active-active clustered system, and, having completed execution of the specialized recovery protocol, resuming normal treatment of large write requests from the host computer. In this way, the need and complexity of managing large writes and maintaining their corresponding sub-uber information during recovery from a forced reboot, crash, or disaster involving the primary or secondary node can be avoided, and storage accessibility hiccups due to performing the large writes can be limited or reduced.

Figure 1A:
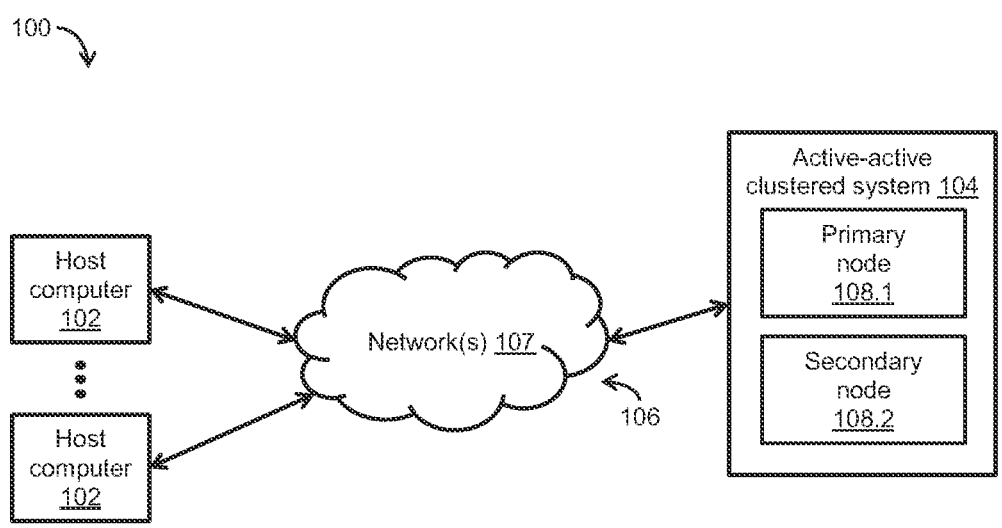
FIG. 1a is a block diagram of an exemplary storage environment, in which techniques can be practiced for limiting or reducing storage accessibility "hiccups" in active-active clustered systems that perform large write operations (or "large writes")

FIG. 1a depicts an illustrative embodiment of an exemplary storage environment 100, in which techniques can be practiced for limiting or reducing storage accessibility hiccups in active-active clustered systems that perform large writes. As shown in FIG. 1a, the storage environment 100 can include a plurality of host computers 102, an active-active clustered system 104 that includes a primary storage processor (or "primary node") 108.1 and a secondary storage processor (or "secondary node") 108.2, and a communications medium 106 that includes at least one network 107. For example, each of the plurality of host computers 102 may be configured as a web server computer, a file server computer, an email server computer, an enterprise server computer, or any other suitable client/server computer or computerized device. The plurality of host computers 102 can provide, over the network(s) 107, storage input/output (IO) requests (e.g., small computer system interface (SCSI) commands, network file system (NFS) commands) to the active-active clustered system 104. Such storage IO requests (e.g., read requests, write requests) can direct storage processors such as the primary node 108.1 and the secondary node 108.2 to read or write data blocks, data pages, data files, or any other suitable data elements to/from logical units (LUs), volumes, filesystems, and/or any other suitable storage objects or resources maintained in association with the active-active clustered system 104.

The communications medium 106 can be configured to interconnect the plurality of host computers 102 with the primary node 108.1 and the secondary node 108.2 of the active-active clustered system 104 to enable them to communicate and exchange data, metadata, and/or control signaling. As shown in FIG. 1a, the communications medium 106 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 106 can include copper-based data communications devices and cabling, fiber optic devices and cabling, wireless devices, or any suitable combination thereof.

Figure 1B:
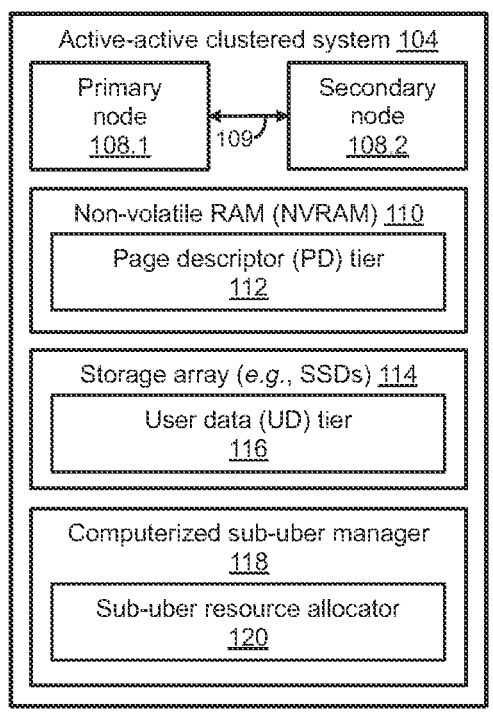

FIG. 1b depicts a detailed view of the active-active clustered system 104 of FIG. 1a. As employed herein, the term "active-active clustered system" can refer to a highly available storage system, in which multiple storage nodes (e.g., the primary node 108.1, the secondary node 108.2) have read-write access to the same storage objects (e.g., LUs, volumes, filesystems) or other resources. As shown in FIG. 1b, the active-active clustered system 104 can include at least two nodes for high availability, namely, the primary node 108.1 and the secondary node 108.2, which can be communicably connected to one another by a communication path 109. The active-active clustered system 104 can include a nonvolatile random access memory (NVRAM) 110 that contains a shared page descriptor (PD) tier 112, a storage array 114 that includes solid-state drives (SSDs), hard disk drives (HDDs), and/or nonvolatile memory (NVM) devices configured to accommodate a user data (UD) tier 116, and a computerized sub-uber manager 118 that includes a sub-uber resource allocator 120. In one embodiment, the primary node 108.1 can receive storage IO requests from the host computers 102 over the network(s) 107. In response to receipt of the storage IO requests, the primary node 108.1 can perform storage IO operations (e.g., read operations, write operations) to read/write data blocks, data pages, data files, or any other suitable data elements from/to one or more storage objects or other resources maintained in association with the active-active clustered system 104. Further, at least at intervals, the primary node 108.1 can log, update, and/or synchronize PD metadata in the PD tier 112, as well as log and/or update page buffer (PB) data in its own page buffer (PB) tier (see, e.g., FIG. 1c, reference numeral 132). In response to a forced reboot, crash, or disaster involving the primary node 108.1, the secondary node 108.2 can assume the role and/or duties of the primary node 108.1 with regard to handling storage IO requests from the host computers 102, thereby providing high availability within the active-active clustered system 104. In one embodiment, the PD tier 112 and the PB tier 136 can each be configured as a ring buffer, a linear buffer, a binary tree (e.g., B-tree), or any other suitable memory structure.

Figure 1C:
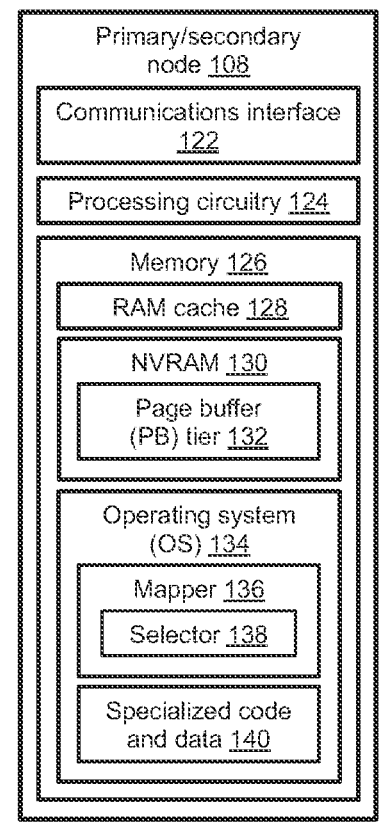
FIG. 1c is a block diagram of an exemplary primary or secondary node that can be included in the active-active clustered system of FIG. 1b.

FIG. 1c depicts an exemplary implementation of a primary or secondary node 108. It is noted that each of the primary node 108.1 and the secondary node 108.2 of the active-active clustered system 104 can be implemented like the primary/secondary node 108 of FIG. 1c. As shown in FIG. 1c, the primary/secondary node 108 can include a communications interface 122, processing circuitry 124, a memory 126, and/or any other suitable storage node component(s). The communications interface 122 can include an InfiniBand interface, an Ethernet interface, an IEEE 802.11x (WiFi) interface, a Bluetooth interface, and/or any other suitable communications interface. The communications interface 122 can further include SCSI target adapters, network interface adapters, and/or any other suitable adapters for converting electronic, optical, and/or wireless signals received over the network 107 to a form suitable for use by the processing circuitry 124.

The memory 126 can include non-persistent memory (e.g., dynamic random-access memory (DRAM), static random-access memory (SRAM)) and/or persistent memory (e.g., flash memory, magnetic memory). As such, the memory 126 can include a RAM cache 128, as well as an NVRAM 130 that contains a PB tier 132. The memory 126 can be configured to store a variety of software constructs including a mapper module (or "mapper") 136 that includes a selector component (or "mapper selector") 138 and other specialized code and data 140, which can be executed by the processing circuitry 124 as program instructions within an operating system 134 to carry out the techniques disclosed herein. For example, the operating system (OS) 134 may be implemented as a Linux OS, Unix OS, Windows OS, or any other suitable operating system. The mapper 136 can employ a tree structure for storing user data in the UD tier 116 within the storage array 114. In one embodiment, the tree structure can be configured as a B-tree structure that includes multiple levels for accommodating root pages, top pages, middle (or "mid") pages, leaf pages, virtual large blocks (VLBs), and physical large blocks (PLBs). The root pages can be configured to provide a logical address space with pointers to respective ones of the top pages, which can be configured with pointers to respective ones of the mid-pages. Further, the mid-pages can be configured with pointers to respective ones of the leaf pages, which can be configured with pointers to the VLBs. The VLBs can include reference counts, compression maps, and/or accounting information for the PLBs, each of which can be configured to provide a two (2) megabyte (Mb) physical space for storing the user data.

The processing circuitry 124 can include one or more physical processors and/or engines configured to execute the software constructs (e.g., the OS 134, the mapper 136, the specialized code and data 140) stored in the memory 126, as well as data movers, director boards, blades, IO modules, drive controllers, switches, and/or any other suitable computer hardware or combination thereof. For example, the processing circuitry 124 may execute the program instructions out of the memory 126, process storage IO requests (e.g., read requests, write requests) from the host computers 102, and store data, metadata, and/or user data in the storage tiers 112, 116, 132 of the active-active clustered system 104 within the storage environment 100, which can be a clustered RAID environment.

In the context of the processing circuitry 124 being configured to execute the software constructs (e.g., the mapper 136, the specialized code and data 140) as program instructions out of the memory 126, a computer program product can be configured to deliver all or a portion of the program instructions to the processing circuitry 124. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the processing circuitry 124, the various techniques disclosed herein.

During operation, the disclosed techniques can limit or reduce storage accessibility hiccups in active-active clustered systems that perform large write operations (or "large writes"). In the disclosed techniques, in response to receipt of a large write request from one of the host computers 102, the primary node 108.1 or the secondary node 108.2 of the active-active clustered system 104 can perform a large write that includes logging PD metadata associated with the large write in the PD tier 112, and ingesting a chunk of user data associated with the large write directly to the UD tier 116 within the storage array 114.

Figure 2:
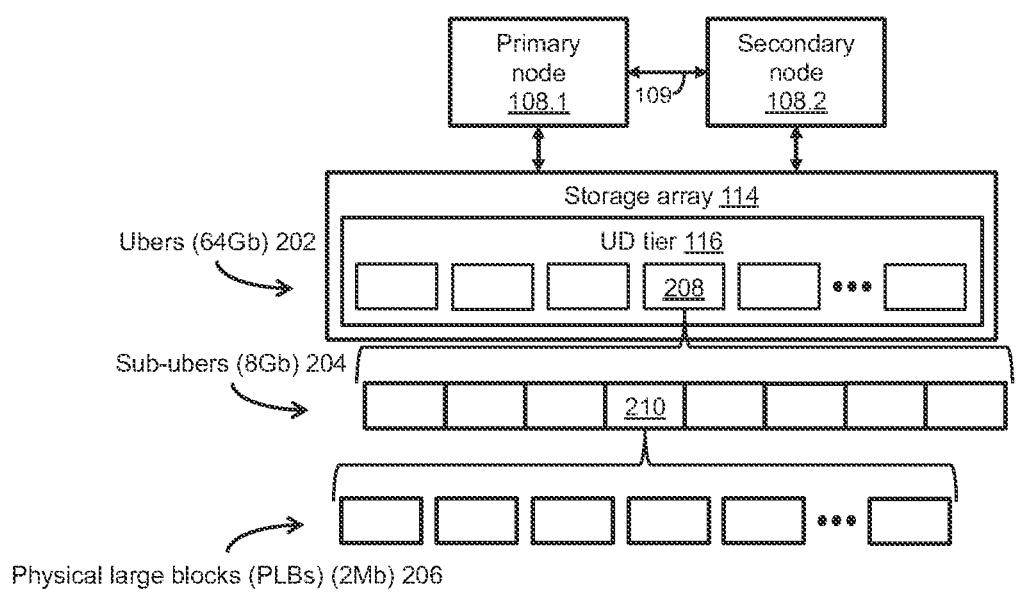
FIG. 2 is a block diagram of an exemplary primary node, an exemplary secondary node, and an exemplary storage array that can be included in the active-active clustered system of FIG. 1b, in which the storage array includes a user data (UD) tier containing a plurality of ubers, each uber includes a plurality of sub-ubers, and each sub-uber includes a plurality of physical large blocks (PLBs)

FIG. 2 depicts the primary node 108.1, the secondary node 108.2, and the storage array 114 of the active-active clustered system 104. As shown in FIG. 2, the storage array 114 contains an illustrative embodiment of the UD tier 116, which can include a plurality of large storage portions 202 referred to herein as "ubers," each of which can have a size of 64 gigabytes (Gb) or any other suitable size. Each of the ubers 202 (e.g., an uber 208; see FIG. 2) can include a plurality of large storage sub-portions 204 referred to herein as "sub-ubers," each of which can have a size of 8 Gb or any other suitable size Each of the sub-ubers 204 (e.g., a sub-uber 210; see FIG. 2) can correspond to 8 Gb of contiguous storage that includes a plurality of physical large blocks (PLBs) 206, each of which can have a size of 2 Mb or any other suitable size. As described herein, the PLBs 206 can be incorporated into a level of a B-tree structure, which can be employed by the mapper 136 for storing user data in the UD tier 116.

In the disclosed techniques, in response to a forced reboot, crash, or disaster involving the primary node 108.1 or the secondary node 108.2 of the active-active clustered system 104, a surviving, failover, or rebooted node from among the primary and secondary nodes 108.1, 108.2 can execute a specialized recovery protocol that avoids the need and complexity of interacting with the sub-uber manager 118 to manage large writes and maintain their corresponding sub-uber information. Such sub-uber information can be maintained by the sub-uber manager 118, and can include address locations of dedicated sub-ubers for the primary and secondary nodes 108.1, 108.2, identifiers of storage nodes that allocated storage for the dedicated sub-ubers, and states (e.g., available, unavailable, consumed) of the dedicated sub-ubers. In the disclosed techniques, the specialized recovery protocol can include treating each large (e.g., 1 Mb) write request from the host computers 102 as a plurality of small (e.g., 4 Kb) write requests (e.g., 256 small write requests), and performing a small write for each such small write request. Each small write can include logging PD metadata in the PD tier 112, and logging PB data in the PB tier 132. In the disclosed techniques, the specialized recovery protocol can include draining all dedicated sub-ubers for the primary and secondary nodes 108.1, 108.2 in the UD tier 116, and, having drained all of the dedicated sub-ubers, resuming normal treatment of large write requests from the host computers 102. In this way, storage accessibility hiccups due to performing the large writes can be limited or reduced.

Figures 3A, 3B:
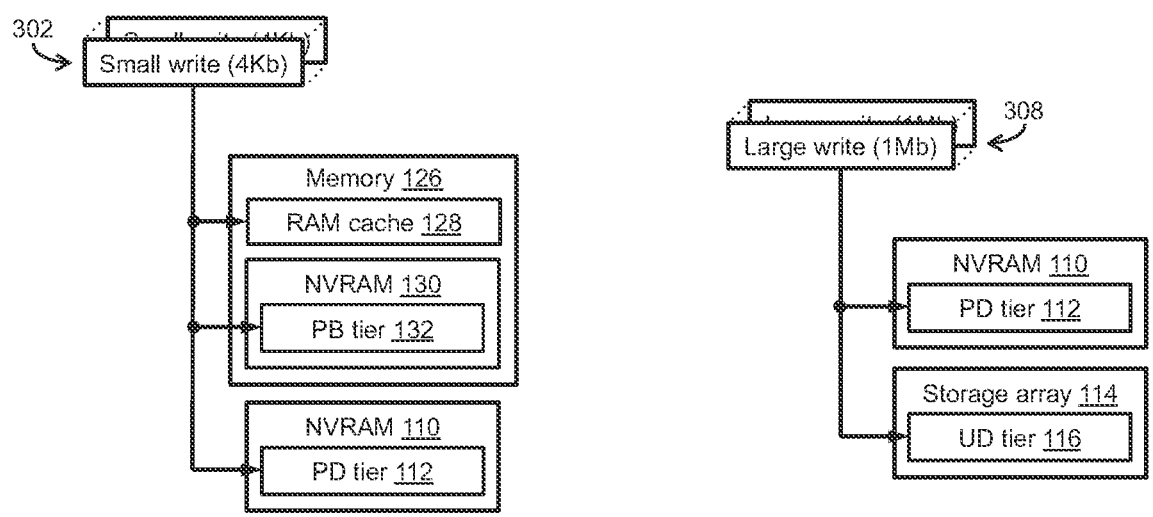
FIG. 3a is a block diagram of an exemplary memory elements that can be included in the primary or secondary node of FIG. 1c, in which the memory elements include a random access memory (RAM) cache, a nonvolatile RAM (NVRAM) containing a page buffer (PB) tier, and an NVRAM containing a page descriptor (PD) tier, the memory elements being configured to handle small writes performed by the primary or secondary node of FIG. 1c.
FIG. 3b is a block diagram of the NVRAM containing the PD tier of FIG. 3a, and the storage array of FIG. 2, in which the NVRAM and the storage array are configured to handle large writes performed by the primary or secondary node of FIG. 1c.

The disclosed techniques for limiting or reducing storage accessibility hiccups in active-active clustered systems that perform large writes will be further understood with reference to the following illustrative example and FIGS. 1b, 3a, and 3b. FIG. 3a depicts the memory 126 and the NVRAM 110, configurations of which can be included in the primary node 108.1 and the secondary node 108.2 of the active-active clustered system 104. FIG. 3b depicts the NVRAM 110 and the storage array 114, configurations of which can likewise be included in the primary node 108.1 and the secondary node 108.2 of the active-active clustered system 104. As shown in FIG. 3a, the memory 126 can include the RAM cache 128 and the NVRAM 130, which can contain the PB tier 132 for logging PB data. FIG. 3b depicts the NVRAM 110 containing the PD tier 112 and the storage array 114, which can contain the UD tier 116 for storing user data. In this example, it is assumed that the primary and secondary nodes 108.1, 108.2 can each perform small (4 Kb) writes 302 (see FIG. 3a) in response to small write requests from the host computers 102, as well as large (1 Mb) writes 308 (see FIG. 3b) in response to large write requests from the host computers 102.

Each of the small writes 302 performed by the primary node 108.1 or the secondary node 108.2 can include logging 512 byte PD metadata associated with the small write in the PD tier 112 (see FIG. 3a), logging 4 Kb PB data associated with the small write in the PB tier 132 (see FIG. 3a), and maintaining in-memory representations of the PD and PB metadata/data in the RAM cache 128 (see FIG. 3a) based on the persistent PD/PB log information. Each of the small writes 302 performed by the primary or secondary nodes 108.1, 108.2 can further include performing asynchronous flush operations to flush or move PB data to the storage array 114, and to maintain logical block address (LBA) mappings of locations of the PB data within the storage array 114. Each of the large writes 308 performed by the primary node 108.1 or the secondary node 108.2 can include logging 512 byte PD metadata associated with the large write in the PD tier 112, and storing or ingesting 1 Mb chunks of user data directly to the UD tier 116 within the storage array 114, in which each user data chunk is made up of 256 4 Kb PB data elements. Each of the large writes 308 performed by the primary node 108.1 or the secondary node 108.2 can further include performing asynchronous flush operations on all sub-ubers in the UD tier 116 to maintain LBA mappings of locations of the user data chunks within the storage array 114.

It is noted that for the small writes 302 and the large writes 308, there is no difference in the native page size or granularity of metadata associated with the small and large writes 302, 308. Rather, the difference is in the location where data associated with the small and large writes 302, 308 is persisted and how the data is ultimately flushed. For the small writes 302, its associated data is persisted in the PB tier 132 and ultimately flushed or moved to the storage array 114, while maintaining LBA mappings of locations of the data within the storage array 114, binding the data to those mapping locations, and clearing any information pertaining to the data from the RAM cache 128. For the large writes 308, its associated data is persisted directly to the UD tier 116 and ultimately flushed logically to maintain LBA mappings of locations of the data within the storage array 114, and to bind the data to those mapping locations. The LBA mappings of data locations for the small writes 302 and the large writes 308 can be maintained in memory structures by the mapper 136.

In this example, in response to a forced reboot, crash, or disaster involving the primary node 108.1 and/or the secondary node 108.2 of the active-active clustered system 104, the surviving or failover node, or the first node to reboot, executes a specialized recovery protocol that avoids the need and complexity of interacting with the sub-uber manager 118 to manage large writes and maintain their corresponding sub-uber information. In effect, the surviving, failover, or rebooted node (the "active storage node") 108.1 or 108.2 takes responsibility for all sub-ubers, i.e., its own dedicated sub-ubers and those of the other storage node (while inactive), with regard to draining the sub-ubers and returning them to the sub-uber manager 118. The specialized recovery protocol executed by the active storage node 108.1 or 108.2 includes treating each large (1 Mb) write request from the host computers 102 as a plurality of small (4 Kb) write requests (e.g., 256 small write requests). If the other storage node "fails-back" or otherwise becomes active before the specialized recovery protocol has been completed, then it likewise treats each large write request from the host computers 102 as a plurality of small write requests. For each such small write request, the active storage node 108.1 or 108.2 performs a small write that includes logging PD metadata associated with the small write in the PD tier 112 (see FIG. 3a), logging 4 Kb PB data associated with the small write in the PB tier 132 (see FIG. 3a), and maintaining in-memory representations of the PD and PB metadata/data in the RAM cache 128 (see FIG. 3a) based on the persistent PD/PB log information.

The specialized recovery protocol executed by the active storage node 108.1 or 108.2 includes draining all dedicated sub-ubers for the primary and secondary nodes 108.1, 108.2 in the UD tier 116. In this example, such draining of dedicated sub-ubers includes purging, from the sub-uber resource allocator 120 (see FIG. 1b), addresses of all user data chunks stored in the dedicated sub-ubers for the active storage node 108.1 or 108.2, and waiting for any inflight large write operations to complete. For example, the sub-uber resource allocator 120 may include a queue that maintains the addresses of all user data chunks, as well as a counter that tracks the count of inflight writes, and decrements the count to zero as the inflight writes are completed. The specialized recovery protocol further includes, once the user data chunk addresses have been purged from the sub-uber resource allocator 120 and all inflight writes have been completed, performing forced flush operations on all sub-ubers in the UD tier 116 to maintain LBA mappings of locations of the user data chunks within the storage array 114, and removing information pertaining to the flushed sub-ubers from all persistent metadata and/or memory structures. In this example, such removing of flushed sub-uber information includes notifying the mapper selector 138 that these sub-ubers are no longer being used for large writes and can be returned to its regular workflow.

The specialized recovery protocol executed by the active storage node 108.1 or 108.2 further includes sending, over the communication path 109, a notification from the active storage node 108.1 or 108.2 to the other storage node (if active) that the draining of all of the dedicated sub-ubers in the UD tier 116 has been completed, thereby completing the specialized recovery protocol. Once the specialized recovery protocol has been completed, the active storage node 108.1 or 108.2, as well as the other storage node (if active), can interact with the sub-uber manager 118 to direct the sub-uber resource allocator 120 to allocate storage for dedicated sub-ubers in the UD tier 116, request sub-ubers for large writes from the mapper selector 138, and resume normal treatment of large write requests from the host computers 102.

Figure 4:
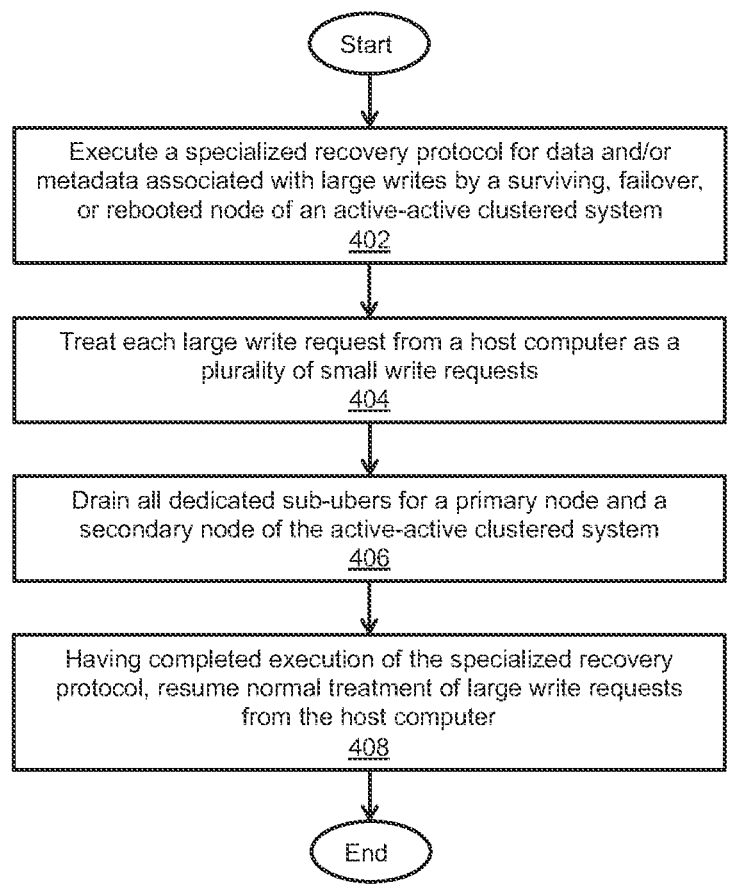
FIG. 4 is a flow diagram of an exemplary method of limiting or reducing storage accessibility hiccups in active-active clustered systems that perform large writes.

An exemplary method of limiting or reducing storage accessibility hiccups in active-active clustered systems that perform large writes is described below with reference to FIG. 4. As depicted in block 402, a specialized recovery protocol for data and/or metadata associated with large writes is executed by a surviving, failover, or rebooted node of an active-active clustered system. While execution of the specialized recovery protocol is in progress, each large write request from a host computer is treated as a plurality of small write requests, as depicted in block 404, and all dedicated sub-ubers for a primary node and a secondary node of the active-active clustered system are drained, as depicted in block 406. As depicted in block 408, having completed execution of the specialized recovery protocol, normal treatment of large write requests from the host computer is resumed. In this way, the need and complexity of managing large writes and maintaining their corresponding sub-uber information during recovery from a forced reboot, crash, or disaster involving the primary or secondary node can be avoided, and storage accessibility hiccups due to performing the large writes can be limited or reduced.

Having described the above illustrative embodiments, various alternative embodiments and/or variations may be made and/or practiced. For example, it was described herein that, in response to a forced reboot, crash, or disaster involving the primary node 108.1 and/or the secondary node 108.2 of the active-active clustered system 104, the first surviving or failover node, or the first storage node to reboot, can execute a specialized recovery protocol that avoids the need and complexity of managing large writes and maintaining their corresponding sub-uber information. In one embodiment, if the first node crashes or otherwise becomes inactive during execution of the specialized recovery protocol, then the other storage node (e.g., the "failback node") can restart the specialized recovery protocol, removing sub-ubers from all persistent metadata and/or memory structures, draining the sub-ubers, and returning them to the sub-uber manager 118. As described herein, if the other storage node fails-back before the specialized recovery protocol has been completed, then, like the first storage node, it can also treat each large write request from the host computers 102 as a plurality of small write requests. In this embodiment, if the first node successfully removed a sub-uber from the persistent metadata and/or memory structures before becoming inactive, then the failback node may not attempt to remove or otherwise handle that sub-uber. However, if the first node started such removal of a sub-uber but did not successfully complete the removal of the sub-uber before becoming inactive, then the failback node can perform acts to remove that sub-uber. Similarly, if the first node started flushing a sub-uber but did not successfully complete the flushing before becoming inactive, then the failback node can perform acts to flush that sub-uber. In this embodiment, if the first node waited for any inflight large write operations to complete before becoming inactive, then it can be concluded that those inflight writes were either acknowledged to the host computers 102 and persisted or were aborted. It is noted that the failback node may not perform such large write operations to sub-ubers because, during execution of the specialized recovery protocol, it treats each large write as a plurality of small writes. It is further noted that the failback node may not need to purge addresses of user data chunks stored in sub-ubers from the sub-uber resource allocator 120 if the sub-ubers were already removed by the first node from the persistent metadata and/or memory structures.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of limiting or reducing storage accessibility hiccups in an active-active clustered system that performs user data chunk write operations, the active-active clustered system including a first storage node and a second storage node, the method comprising:

executing, by the first storage node of the active-active clustered system, a specialized recovery protocol for data and/or metadata associated with the user data chunk write operations, the first storage node being an active node, the specialized recovery protocol comprising, in response to the second storage node of the active-active clustered system transitioning from being an active node to an inactive node:

treating, by the first storage node, each large write request from among one or more large write requests from a host computer as a plurality of small write requests, the large write request corresponding to a request to write a respective user data chunk containing a plurality of data elements, each small write request corresponding to a request to write a respective data element from among the plurality of data elements, the first storage node and the second storage node having their own dedicated sub-ubers into which one or more user data chunks associated with one or more large write requests have been stored or ingested;

draining, by the first storage node, one or more dedicated sub-ubers associated with the first storage node;

returning, by the first storage node, the one or more dedicated sub-ubers associated with the first storage node to a computerized sub-uber manager;

draining, by the first storage node, one or more dedicated sub-ubers associated with the second storage node; and returning, by the first storage node, the one or more dedicated sub-ubers associated with the second storage node to the computerized sub-uber manager, whereby the first storage node takes responsibility for its own dedicated sub-ubers and those of the second storage node with regard to draining and returning them to the computerized sub-uber manager; and having completed execution of the specialized recovery protocol, resuming, by the first storage node, normal treatment of large write requests from the host computer.

2. The method of claim 1 wherein the active-active clustered system includes multiple storage tiers, the multiple storage tiers including a page descriptor (PD) tier, a page buffer (PB) tier, and a user data (UD) tier, and wherein resuming normal treatment of large write requests from the host computer includes:

for each large write request, performing a user data chunk write operation including logging PD metadata associated with the user data chunk write operation in the PD tier, and storing, directly to the UD tier, a user data chunk associated with the user data chunk write operation, the stored user data chunk being made up of a plurality of data elements.

3. The method of claim 2 wherein storing a user data chunk directly to the UD tier includes storing the user data chunk directly to a respective dedicated sub-uber from among the dedicated sub-ubers in the UD tier, and wherein performing a user data chunk write operation includes performing asynchronous flush operations on the dedicated sub-ubers in the UD tier.

4. The method of claim 2 wherein treating each large write request from the host computer as a plurality of small write requests includes:

for each small write request, performing a small write operation including logging PB data associated with the small write operation in the PB tier, logging PD metadata associated with the small write operation in the PD tier, and maintaining in-memory representations of the PB data and the PD metadata based on the logged PB data and the logged PD metadata.

5. The method of claim 1 wherein the first storage node includes a sub-uber resource allocator, and wherein draining the one or more dedicated sub-ubers associated with the first storage node and draining the one or more dedicated sub-ubers associated with the second storage node include:

waiting for inflight user data chunk write operations to complete.

6. The method of claim 5 wherein draining the one or more dedicated sub-ubers associated with the first storage node includes purging, from the sub-uber resource allocator, addresses of the one or more user data chunks stored or ingested into the dedicated sub-ubers of the first storage node, wherein draining the one or more dedicated sub-ubers associated with the second storage node includes purging, from the sub-uber resource allocator, addresses of the one or more user data chunks stored or ingested into the dedicated sub-ubers of the second storage node, and wherein the method comprises:

having purged the addresses of user data chunks from the sub-uber resource allocator and waited for the inflight user data chunk write operations to complete, performing forced flush operations on the dedicated sub-ubers of the first storage node in the UD tier, and performing forced flush operations on the dedicated sub-ubers of the second storage node in the UD tier.

7. The method of claim 6 comprising:
directing the sub-uber resource allocator to allocate storage for additional dedicated sub-ubers in the UD tier.

8. The method of claim 1 wherein the first storage node corresponds to a failover node, wherein the second storage node corresponds to a failback node, and wherein the method comprises:
in response to the failover node becoming inactive during execution of the specialized recovery protocol, restarting the specialized recovery protocol by the failback node.

9. A system for limiting or reducing storage accessibility hiccups in an active-active clustered system that performs user data chunk write operations, the active-active clustered system including a first storage node and a second storage node, the system comprising:
a memory; and
processing circuitry configured to execute program instructions out of the memory to:
execute, by the first storage node of the active-active clustered system, a specialized recovery protocol for data and/or metadata associated with user data chunk write operations, the first storage node being an active node, the specialized recovery protocol comprising, in response to the second storage node of the active-active clustered system transitioning from being an active node to an inactive node:
treating, by the first storage node, each large write request from among one or more large write requests from a host computer as a plurality of small write requests, the large write request corresponding to a request to write a respective user data chunk containing a plurality of data elements, each small write request corresponding to a request to write a respective data element from among the plurality of data elements, the first storage node and the second storage node having their own dedicated sub-ubers into which one or more user data chunks associated with one or more large write requests have been stored or ingested;
draining, by the first storage node, one or more dedicated sub-ubers associated with the first storage node;
returning, by the first storage node, the one or more dedicated sub-ubers associated with the first storage node to a computerized sub-uber manager;
draining, by the first storage node, one or more dedicated sub-ubers associated with the second storage node; and
returning, by the first storage node, the one or more dedicated sub-ubers associated with the second storage node to the computerized sub-uber manager,
whereby the first storage node takes responsibility for its own dedicated sub-ubers and those of the second storage node with regard to draining and returning them to the computerized sub-uber manager; and
having completed execution of the specialized recovery protocol, resume, by the first storage node, normal treatment of large write requests from the host computer.

10. The system of claim 9 wherein the active-active clustered system includes multiple storage tiers, the multiple storage tiers including a page descriptor (PD) tier, a page buffer (PB) tier, and a user data (UD) tier, and wherein the processing circuitry is configured to execute the program instructions out of the memory to, for each large write request, perform a user data chunk write operation including logging PD metadata associated with the user data chunk write operation in the PD tier, and store, directly to the UD tier, a user data chunk associated with the user data chunk write operation, the stored user data chunk being made up of a plurality of data elements.

11. The system of claim 10 wherein the processing circuitry is configured to execute the program instructions out of the memory to:
store the user data chunk directly to a respective dedicated sub-uber from among the dedicated sub-ubers in the UD tier; and
perform asynchronous flush operations on the dedicated sub-ubers in the UD tier.

12. The system of claim 10 wherein the processing circuitry is configured to execute the program instructions out of the memory to perform, for each small write request, a small write operation including logging PB data associated with the small write operation in the PB tier, logging PD metadata associated with the small write operation in the PD tier, and maintaining in-memory representations of the PB data and the PD metadata based on the logged PB data and the logged PD metadata.

13. The system of claim 9 wherein the first storage node includes a sub-uber resource allocator, and wherein the processing circuitry is configured to execute the program instructions out of the memory to:
wait for inflight user data chunk write operations to complete.

14. The system of claim 13 wherein the processing circuitry is configured to execute the program instructions out of the memory to:
purge, from the sub-uber resource allocator, addresses of the one or more user data chunks stored or ingested into the dedicated sub-ubers of the first storage node;
purge, from the sub-uber resource allocator, addresses of the one or more user data chunks stored or ingested into the dedicated sub-ubers of the second storage node; and
having purged the addresses of user data chunks from the sub-uber resource allocator and waited for the inflight user data chunk write operations to complete, perform forced flush operations on the dedicated sub-ubers of the first storage node in the UD tier, and perform forced flush operations on the dedicated sub-ubers of the second storage node in the UD tier.

15. The system of claim 14 wherein the processing circuitry is configured to execute the program instructions out of the memory to direct the sub-uber resource allocator to allocate storage for additional dedicated sub-ubers in the UD tier.

16. The system of claim 9 wherein the first storage node corresponds to a failover node, wherein the second storage node corresponds to a failback node, and wherein the processing circuitry is configured to execute the program instructions out of the memory to:

in response to the failover node becoming inactive during execution of the specialized recovery protocol, restart the specialized recovery protocol by the failback node.

17. A computer program product including a set of non-transitory, computer-readable media having instructions that, when executed by processing circuitry, cause the processing circuitry to perform a method comprising:

executing, by a first storage node of an active-active clustered system, a specialized recovery protocol for data and/or metadata associated with user data chunk write operations, the first storage node being an active node, the specialized recovery protocol comprising, in response to the second storage node of the active-active clustered system transitioning from being an active node to an inactive node:

treating, by the first storage node, each large write request from among one or more large write requests from a host computer as a plurality of small write requests, the large write request corresponding to a request to write a respective user data chunk containing a plurality of data elements, each small write request corresponding to a request to write a respective data element from among the plurality of data elements, the first storage node and the second storage node having their own dedicated sub-ubers into which one or more user data chunks associated with one or more large write requests have been stored or ingested;

draining, by the first storage node, one or more dedicated sub-ubers associated with the first storage node;

returning, by the first storage node, the one or more dedicated sub-ubers associated with the first storage node to a computerized sub-uber manager;

draining, by the first storage node, one or more dedicated sub-ubers associated with the second storage node; and returning, by the first storage node, the one or more dedicated sub-ubers associated with the second storage node to the computerized sub-uber manager, whereby the first storage node takes responsibility for its own dedicated sub-ubers and those of the second storage node with regard to draining and returning them to the computerized sub-uber manager; and having completed execution of the specialized recovery protocol, resuming, by the first storage node, normal treatment of large write requests from the host computer.

18. The computer program product of claim 17 wherein the active-active clustered system includes multiple storage tiers, the multiple storage tiers including a page descriptor (PD) tier, a page buffer (PB) tier, and a user data (UD) tier, and wherein resuming normal treatment of large write requests from the host computer includes:

for each large write request, performing a user data chunk write operation including logging PD metadata associated with the user data chunk write operation in the PD tier, and storing, directly to the UD tier, a user data chunk associated with the user data chunk write operation, the stored user data chunk being made up of a plurality of data elements.

19. The method of claim 1 wherein the respective user data chunk has a size of one (1) megabyte (Mb), wherein the respective data element has a size of four (4) kilobytes (Kb), and wherein each of the dedicated sub-ubers has a size of eight (8) gigabytes (Gb).

20. The system of claim 9 wherein the respective user data chunk has a size of one (1) megabyte (Mb), wherein the respective data element has a size of four (4) kilobytes (Kb), and wherein each of the dedicated sub-ubers has a size of eight (8) gigabytes (Gb).

\* \* \* \* \*